Oct. 14, 1952  D. G. FALLON  2,614,199
CONTROL SYSTEM FOR ELECTRIC APPLIANCES
Filed Sept. 9, 1950
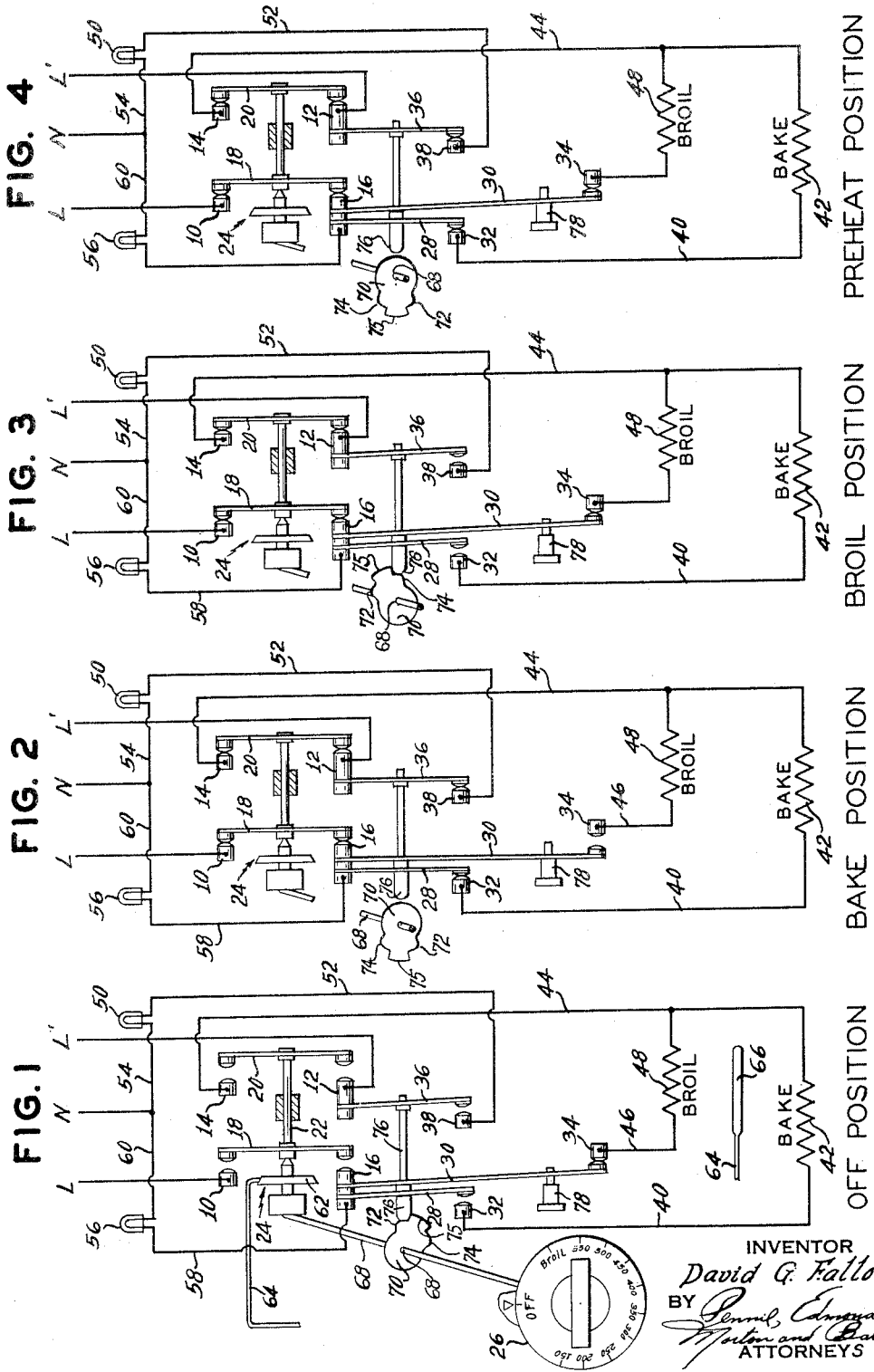
INVENTOR
David G. Fallon
BY Pennie, Edmonds,
Morton and Barrows
ATTORNEYS

UNITED STATES PATENT OFFICE 2,614,199

CONTROL SYSTEM FOR ELECTRIC APPLIANCES

David Gedde Fallon, Jersey City, N. J., assignor to The Wilcolator Company

Application September 9, 1950, Serial No. 183,951

10 Claims. (Cl. 219—20)

My invention relates to improvements in electric heating systems for cooking ovens, particularly systems of the type including indicating means, such as pilot lights, for showing at a glance the setting of the oven control and the condition of the oven.

In prior systems of this type special switches for the pilot lights were added to the oven control and an extra operating means was also provided. According to my invention I make use of a known type of oven control and, with minor changes, I provide a simple arrangement for including a pair of pilot lights in the system to indicate the condition of the oven and the position of the oven control dial.

The oven heating system to which my improvements are applied comprises a pair of current supply conductors with or without a neutral line, a circuit including a baking element, usually mounted in the lower part of the oven, a thermostat responsive to change in temperature in the oven and for maintaining a selected temperature therein, a dial for setting the thermostat, a switch controlled by the thermostat for connecting and disconnecting the conductors respectively with the opposite sides of the baking element, a switch in the baking element part of the circuit normally biased to closed position, and an actuating means including a cam operable by the dial for opening the switch in the baking element circuit when the dial is turned to "off" position.

In this system I include a pilot light connected through a switch to one of the current supply conductors and directly to the other conductor or to the neutral line, the switch being arranged in parallel with the bake element switch and operable simultaneously therewith by said actuating means. This system also preferably includes a second pilot light connected into the outlet of the thermostatically controlled switch.

When the dial of the oven control is turned from the "off" position the first pilot light is immediately lighted, and as the dial is turned to a baking temperature setting the second pilot light is lighted. Both lights stay lighted until the oven is at the set temperature when the second light is turned out by the thermostat thereby indicating to the operator that the oven is ready.

The features of my invention are also advantageously applied to an oven heating system which includes both bake and broil heating elements arranged in parallel. In this case the broil element circuit includes a switch biased to open position and actuated to closed position by bake switch actuating means. Since the dial must be turned from the "off" position to permit the thermostat to function, the cam is simply enlarged or a separate cam element provided, at the highest temperature setting for the dial, for closing the broil switch and opening the bake switch. This operation turns off the first pilot light and leaves the second pilot light on, which will indicate to the operator that the oven control is set for broiling.

The cam arrangement is an important feature of the system which includes both bake and broil elements. Since in this system the "off" and "broil" positions of the dial are near each other, a single cam may be provided to cover these two positions or two similar cams or cam sections may be provided in a simple structure mounted on the dial or dial stem.

The detailed features of the invention will be described hereinafter in connection with a single illustrative embodiment shown in the accompanying drawings in which:

Figs. 1 to 4 inclusive are diagrammatic views of an oven heating system including the features of the invention, showing the various elements when the controls are in the "off," "baking," "broiling" and "preheating" positions, respectively.

In the drawings the heating system is illustrated in connection with the use of a three wire current supply so that 220 volt current may be used for energizing the heating elements. Outside conductors L and L' for supplying 220 volt current are respectively connected into contact mountings 10 and 12 of a thermostatically controlled switch. A neutral conductor N is used in connection with the pilot lights which are operated with 110 volt current. The contact mountings 10 and 12 of the switch are fixed in a conventional manner to a casing of insulation material and the thermostatic switch also includes fixed contact mountings 14 and 16. A pair of interconnected bridge conductors 18 and 20, carrying contacts at their opposite ends, are associated with the four fixed contacts of the mountings 10, 12, 14 and 16 in the manner shown in the drawings. The bridges 18 and 20 are of conventional type and interconnected by an insulating member 22. This bridge assembly is movable away from the fixed contacts by a thermostat 24 and by operation of a dial 26. Conventional spring means, not shown, is employed for biasing the bridge assembly toward the fixed contacts of the switch.

The contact mounting 16 carries, in a rigid manner, a pair of spring switch blades 28 and 30 having contacts mounted at their free ends adapted to respectively engage fixed contact mountings 32 and 34. The fixed contact mounting 12 carries a rigidly mounted spring switch blade 36 having a contact at its free end engaging a fixed contact mounting 38.

The bake portion of the circuit includes a conductor 40 connected into the fixed contact 32 of the bake switch, a resistance heating element 42, and a conductor 44 connected into the fixed contact mounting 14. The broil portion of the circuit, when included in the system, includes a conductor 46 connected into the fixed contact mounting 34 of the broil switch and a resistance heating element 48 connected into the conductor 44, which is common to the bake and broil elements 42 and 48.

A pilot light 50, which may be referred to as the "on" light or indicator, and which lights as soon as the dial 26 is turned from the off position, is connected through a conductor 52 with the fixed contact mounting 38 and by a conductor 54 with the neutral line N. A second pilot light 56, which may be called the "cycling" light, and which goes off and on as the thermostatic switch is opened and closed, is conected by a conductor 58 with the fixed contact mounting 16 and by a conductor 60 with the neutral line N. The pilot lights 50 and 56 are incandescent lamps of any convenient design operated by 110 volt current and they may have different colors and be placed as desired with respect to the oven control dial.

In the drawings, the thermostat is shown diagrammatically as including a bellows or expansion chamber 62 connected by a flexible tube 64 with a bulb 66 mounted in the oven where it is heated by the bake and broil elements 42 and 48. The thermostat also includes a shaft 68 on which the dial 26 is mounted and by which the thermostat is set for a particular temperature.

When the oven is heated to the temperature for which the thermostat is set, the expansion of the fluid in bulb 66 will actuate the bellows or expansion chamber 62 to disengage the contact bridges 18 and 20. This cuts off the current to the bake and broil elements and also to the cycling pilot light 56.

The cam means referred to above and associated with the dial are illustrated diagrammatically in the drawings as integral with a disc-like member 70 fixed to the shaft 68, although it may be mounted under the dial and have a somewhat different shape so long as it includes a pair of cam sections 72 and 74 having approximately the relative angular positions shown. In the form illustrated the cam disc 70 includes a projection 75 which separates the cam surfaces 72 and 74 and which also serves as a stop for the dial at the "off" and broil positions. The cam disc 70 may be made without the stop projection 75 so that the cam sections 72 and 74 comprise a single cam extending through the "off" and broil positions.

The cam sections 72 and 74 are adapted to actuate a push rod 76 engaging the switch blades 28, 30 and 36. The push rod 76 may be arranged with slots or shoulders engaging the spring blades 28, 30 and 36, or the latter may have lugs or other members engaged by the push rod 76.

If it is desired to conduct a rapid preheating operation a push button 78 is provided as an independent means for actuating the blade 30 for closing the broil switch. This push button and its method of operation by hand and its release by the thermostat are described in Patent No. 2,441,192. The switch blade 30 is biased to open position and when closed by the push button 78, after a baking temperature has been set by the dial 26, the push button is held in by a latch which is released by the thermostat when the oven reaches the set temperature, or somewhat before.

In the operation of the system shown in the drawings, it will be noted that in Fig. 1 the dial 26 is at the "off" position with the stop 75 against the push rod 76, and that the contacts of the bridges 18 and 20 are held out of engagement with their respective fixed contacts by the thermostat 24. Both pilot lights are out. When the dial 26 is turned to this position, the cam 70 actuates the push rod 76 to actuate the switch blades 28 and 36 to open the bake switch and the switch for the pilot light 50. At the same time, the push rod 76 closes the broil switch at contact 34, but this is of no significance since the double pole thermostatic switch is held open and remains open as long as the dial is set at the "off" position.

Fig. 2 of the drawings shows the position of the various movable elements of the system set for a baking operation at a selected baking temperature. Since the dial 26 is turned in a clockwise direction to make the temperature setting, the first change that takes place from that shown in Fig. 1 is the release of the push rod 76 and the switch blades 28, 30 and 36, so that the contacts 32 and 38 are engaged. Now since the contact mounting 12 is connected directly to L', current will be supplied through the blade 36 to the pilot light 50 which will stay lighted throughout the entire baking period.

As the dial 26 is rotated in a clockwise direction, to the desired temperature setting, the bridges 18 and 20 of the thermostatic switch are released and move to closed position, so that current is then supplied from the conductor L, through the bridge 18, the blade 28, conductor 40, and the bake element 42, conductor 44 and bridge 20 to mounting 12, and to the conductor L'. A circuit is also closed through the pilot light 56 from the contact mounting 16, conductor 58 and conductor 60 to the line N. This pilot light 56 is on at the same time and each time the bake element 42 is energized.

It will be noted that when the oven is being heated up both pilot lights 50 and 56 are on. When the oven reaches the set temperature the thermostat opens its switch thereby deenergizing the bake element and light 56. This indicates to the operator that the oven is ready for a baking operation.

If it is desired to have the oven heated up rapidly for a baking operation, the operator, after setting the dial as in Fig. 2, actuates the push button 78 as shown in Fig. 4 to move switch blade 30 into engagement with the contact 34. In other respects the positions of the elements in Fig. 4 are the same as in Fig. 2. Current for the broil element 48, passes from the contact mounting 16, the blade 30, and the element 48 to the conductor 44. As soon as the oven is ready the thermostat opens the thermostatically controlled switch and also releases the push button 78. When the temperature in the oven falls below the set temperature during the baking operation, the bake element 42 and pilot light 56 are reenergized but the broil element remains deenergized.

During this cycling operation, the pilot light 56 is cycled on and off with the bake element.

At the end of the baking operation, the operator rotates the dial 26 counterclockwise to the "off" position. This operation opens the thermostatic switch and brings the cam 72 into engagement with the push rod 76 thereby moving the switch blades 28 and 36 from the contacts 32 and 38 respectively. This latter operation opens the circuit to the baking element 42 and the circuit to the pilot light 50. As the operator sees the light 50 go out, he knows that the oven is properly turned off.

Fig. 3 of the drawings illustrates the circuit employed and the position of the elements of the system in carrying out a broiling operation in the oven. The dial carries the word "broil" at the highest temperature setting on the dial, a stop being provided by the projection 75 at that point to prevent further clockwise rotation of the dial. The dial 26 is rotated clockwise until the side of the stop 75 engages the push rod 76, which locates the broil position of the dial at the setting index. At the start of this operation the cam 72 releases the switch blades 28 and 36 so that the pilot light 50 comes on momentarily but as the rotation reaches the broil position, the cam 74 actuates the push rod 76 (which is insulated from the switch blades) to disengage the switch blades 28 and 36 and engage the contact of blade 30 with the contact mounting 34 thereby permitting current to flow from the conductor L through the thermostatic switch, the blade 30, and the broil element 48 to the conductor L'.

The connections provided as shown in Fig. 3 leave the "on" pilot light 50 disconnected and the pilot light 56 on, which will indicate to the operator that he has properly connected up the system to carry on a broiling operation. The cycling pilot light 56 will be on unless the oven should reach an extremely high temperature which would cause the thermostat to open the switch controlled thereby. But so long as the pilot light 56 and that alone is on, the operator will know that the broiling operation is proceeding, this being the only time when the system is in use that the pilot light 50 is off.

Since broiling operations are usually conducted with the oven door either open or opened and closed frequently, the pilot light 56 will probably stay on continuously for the entire broiling period. After the broiling operation is completed the operator rotates the dial 26 counterclockwise so that the cam 74 released the push rod 76 and blade 36, which momentarily lights the pilot light 50 until the counterclockwise rotation is nearly completed when the cam 72 actuates the push rod 76 to disengage the switch blades 28 and 36. The thermostatic switch is also opened and both pilot lights are deenergized.

In the off position as shown in Fig. 1 the switch blade 30 engages the contact mounting 34 to connect the broiling element 48 with the contact mounting 16 but that is a perfectly safe operation since when the dial 26 is in the off position the thermostatically controlled bridges 18 and 20 are maintained in open position by the thermostat. In this position the contact mounting 16 is not connected to either of the current supply conductors L or L'.

If the cams or cam sections 72 and 74 are made as a single continuous cam a separate stop may be provided for the dial. The cam 72 or both cams may operate a lever instead of the push rod 76 to control the respective switch blades.

The features of the invention may be applied to various types of electric heating systems other than ovens and to systems including one or more heating elements.

I claim:

1. In a control system for an electrically heated appliance, a pair of current supply conductors, a circuit including a heating element, a thermostat responsive to the temperature of the appliance, a dial for setting the thermostat, a double pole switch controlled by the thermostat for connecting and disconnecting the conductors respectively with the opposite sides of the circuit, a separate switch in the heating element part of the circuit biased to closed position, a pilot light circuit including a pilot light connected into at least one of said conductors in advance of the thermostatically controlled switch and having a switch therein biased to closed position, said pilot light switch and said heating element switch each including a spring switch blade, said blades being mounted in parallel, means associated with said switch blades for actuating them in unison, and a common actuating means operatively associated with the dial and with said means for actuating the heating element switch blade and the pilot light switch blade for simultaneously moving the heating element switch and the pilot light switch to open position when the dial is turned to "off" position, said actuating means being adapted to release the switches actuated thereby to their biased positions when the dial is turned from the "off" position, whereby said pilot light will be lighted when the actuating means releases the switches controlled thereby.

2. In a control system for an electric oven, a pair of current supply conductors, a circuit including a bake element and a broil element arranged in parallel, a thermostat responsive to the temperature of the oven, a dial for setting the thermostat, a double pole switch controlled by the thermostat for connecting and disconnecting the conductors respectively with the opposite sides of the circuit, a separate switch in the bake element part of the circuit biased to closed position, a switch in the broil element part of the circuit biased to open position, a pilot light circuit including a pilot light connected into at least one of said conductors in advance of the thermostatically controlled switch and having a switch therein biased to closed position, and a common actuating means for simultaneously moving the bake element switch and the pilot light switch to open position and the broil element switch to closed position, said actuating means being associated with the dial for operation thereby and adapted to be operated to release the switches actuated thereby to their biased positions.

3. A control system as claimed in claim 2, in which said common actuating means comprises a cam operatively associated with the dial of the thermostat and positioned with respect thereto so as to hold the pilot light switch and the bake element switch in open position when the dial is set at its off position.

4. A system as claimed in claim 3, in which said cam is adapted to release said pilot light switch and the bake switch to closed position upon rotation of said dial from the off position, whereby said pilot light will be lighted.

5. A system as claimed in claim 2, in which said common actuating means includes a cam operatively associated with the dial of the thermostat, a broiling position on said dial at the highest temperature setting thereon, said cam being positioned at said broil position and adapted to move at least a portion of said common actuating means thereby to simultaneously actuate the bake element switch and the pilot light switch to open position and the broil element switch to closed position when the dial is rotated to the broil position.

6. A control system as claimed in claim 2, in which said common actuating means comprises a cam disc operatively associated with said dial and includes cam means operative at the off position of the dial, and a second cam means operative at the highest temperature setting of the dial, both said cam means being adapted to actuate the bake element switch the pilot light switch and the broil element switch.

7. A control system as claimed in claim 2, in which said pilot light switch, said broil element switch and the bake element switch each includes a spring switch blade, said blades being mounted in parallel, and means associated with said switch blades for actuating them in unison.

8. A control system as claimed in claim 2, in which said dial has an off position and a broil position, said common actuating means including a pair of cams operatively associated with the dial and operative when the dial is turned to off and broil positions respectively to actuate the bake switch and the pilot light switch to open position and the broil switch to closed position.

9. A control system as claimed in claim 2, in which said dial has an off position and a broil position, said common actuating means including a mounting having a pair of similar cams operatively associated with the dial and operative when the dial is turned either to the "off" or to the broil positions respectively to actuate the bake switch and the pilot light switch to open position and the broil switch to closed position.

10. A control system as claimed in claim 2, in which said dial has an off position and a broil position adjacent to each other, said common actuating means including a cam disc having a pair of similar cams operative associated with the dial, said cams being operative when the dial is turned either to the "off" or to the broil positions respectively to actuate the bake switch and the pilot light switch to open position and the broil switch to closed position, and a projection on said cam disc between said cams serving as a stop for the dial.

DAVID GEDDE FALLON.

REFERENCES CITED

The following references are of record in the file of this patent:

UNITED STATES PATENTS

| Number | Name | Date |
|---|---|---|
| 2,240,340 | Mills et al. | Apr. 29, 1941 |
| 2,327,632 | Frazier | Aug. 24, 1943 |
| 2,403,824 | Newell | July 9, 1946 |
| 2,421,452 | Cody | June 3, 1947 |
| 2,441,192 | Graves | May 11, 1948 |